US012798943B2

(12) United States Patent
Fujita

(10) Patent No.: US 12,798,943 B2
(45) Date of Patent: Nov. 17, 2026

(54) TRANSPORT CART

(71) Applicant: FUJI CORPORATION, Chiryu (JP)

(72) Inventor: Yoshihiro Fujita, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 389 days.

(21) Appl. No.: 18/559,831

(22) PCT Filed: Jun. 10, 2021

(86) PCT No.: PCT/JP2021/022136
§ 371 (c)(1),
(2) Date: Nov. 9, 2023

(87) PCT Pub. No.: WO2022/259467
PCT Pub. Date: Dec. 15, 2022

(65) Prior Publication Data

US 2024/0239639 A1 Jul. 18, 2024

(51) Int. Cl.
*B66F 9/18* (2006.01)
*B66F 9/19* (2006.01)

(52) U.S. Cl.
CPC .................. *B66F 9/18* (2013.01); *B66F 9/19* (2013.01)

(58) Field of Classification Search
CPC ................................ B66F 9/18; B65G 1/0435
See application file for complete search history.

(56) References Cited

U.S. PATENT DOCUMENTS 4,541,768 A * 9/1985 Walker .................... B64F 1/322 414/535
4,787,808 A * 11/1988 Shimoji .................... B62B 3/04 414/536

(Continued)

FOREIGN PATENT DOCUMENTS

CN 109641606 A 4/2019
DE 198 58 308 A1 6/2000

(Continued)

OTHER PUBLICATIONS

International Search Report issued Aug. 10, 2021 in PCT/JP2021/022136, filed on Jun. 10, 2021, 2 pages.

*Primary Examiner* — Jonathan Snelting
(74) *Attorney, Agent, or Firm* — Oblon, McClelland, Maier & Neustadt, L.L.P.

(57) ABSTRACT

A transport cart includes a cargo movement section configured to place a cargo thereon and move the cargo in horizontal, front, and rear directions; a first direction restriction portion to be movable between a restriction position and a restriction release position that are in an up-down relationship, restricts the movement of the cargo placed on the cargo movement section in the front direction at the restriction position, and allow the movement of the cargo placed on the cargo movement section in the front direction at the restriction release position; and a control section to execute pre-restriction release processing of controlling the cargo movement section so that the cargo moves once in the rear direction while maintaining a state where a front restriction portion is located at the restriction position before the front restriction portion located at the restriction position is moved to the restriction release position.

7 Claims, 10 Drawing Sheets

(56) References Cited

U.S. PATENT DOCUMENTS

| | | | | | |
|---|---|---|---|---|---|
| 5,109,971 | A * | 5/1992 | Riner | B65G 69/24 | 193/40 |
| 5,224,812 | A * | 7/1993 | Oslin | B62B 3/04 | 414/498 |
| 6,149,370 | A | 11/2000 | DiBartolomeo | | |
| 8,851,488 | B2 * | 10/2014 | Carruyo | B62B 1/12 | 410/52 |
| 10,618,732 | B2 * | 4/2020 | Iwata | B65G 41/003 | |
| 11,667,228 | B2 * | 6/2023 | Hoeper | B62D 53/005 | 410/94 |
| 2018/0339858 | A1 * | 11/2018 | Iwata | B65G 1/0435 | |

FOREIGN PATENT DOCUMENTS

| | | | |
|---|---|---|---|
| DE | 10 2011 086 935 | A1 | 5/2013 |
| DE | 10 2013 204 165 | A1 | 9/2014 |
| JP | 2013-35492 | A | 2/2013 |

* cited by examiner

TRANSPORT CART

TECHNICAL FIELD

The present disclosure relates to a transport cart.

BACKGROUND ART

Conventionally, there is known a transport cart that prevents a cargo from falling down while transporting the cargo. For example, Patent Literature 1 discloses a transport cart including a transport path for transporting the cargo and a stopper for preventing the cargo from falling down. In the transport cart, the stopper is provided at a distal end of the transport path. Further, the stopper is movable between a lower restriction release position and an upper restriction position, and when the stopper is located at the restriction position, the stopper comes into contact with the cargo to prevent the cargo from falling down on the transport path.

PATENT LITERATURE

Patent Literature 1: JP-A-2013-35492

BRIEF SUMMARY

Technical Problem

However, in the transport cart described in Patent Literature 1, there is a case where the cargo is strongly pressed against the stopper due to vibration or the like when the cargo is transported, and thus the stopper cannot be moved to a release position when the cargo is transferred, or a large power is required to move the stopper to the release position.

The present disclosure has been made to solve the problems described above, and a main object of the present disclosure is to make it easy to release a first direction restriction portion that restricts the movement of the cargo in a horizontal first direction.

Solution to Problem

A transport cart of the present disclosure includes a cargo movement section configured to place a cargo thereon and move the cargo in a horizontal first direction and a second direction opposite to the first direction, a first direction restriction portion provided to be movable between a restriction position and a restriction release position that are in an up-down relationship and configured to restrict the movement of the cargo placed on the cargo movement section in the first direction at the restriction position and allow the movement of the cargo placed on the cargo movement section in the first direction at the restriction release position, and a control section configured to execute pre-restriction release processing of controlling the cargo movement section so that the cargo moves once in the second direction while maintaining a state where the first direction restriction portion is located at the restriction position before the first direction restriction portion located at the restriction position is moved to the restriction release position.

In this transport cart, the pre-restriction release processing of controlling the cargo movement section so that the cargo moves once in the second direction while maintaining a state where the first direction restriction portion is located at the restriction position before the first direction restriction portion located at the restriction position is moved to the restriction release position is executed. For example, after the transport cart is transported in a state where the cargo is placed on the cargo movement section and the first direction restriction portion is positioned at the restriction position, it may be difficult to easily move the first direction restriction portion to the restriction release position because the cargo is strongly pressed against the first direction restriction portion due to vibration or the like. In the transport cart of the present disclosure, since the pre-restriction release processing described above is executed, the first direction restriction portion can be easily moved to the restriction release position.

DESCRIPTION OF EMBODIMENTS

Figure 1:
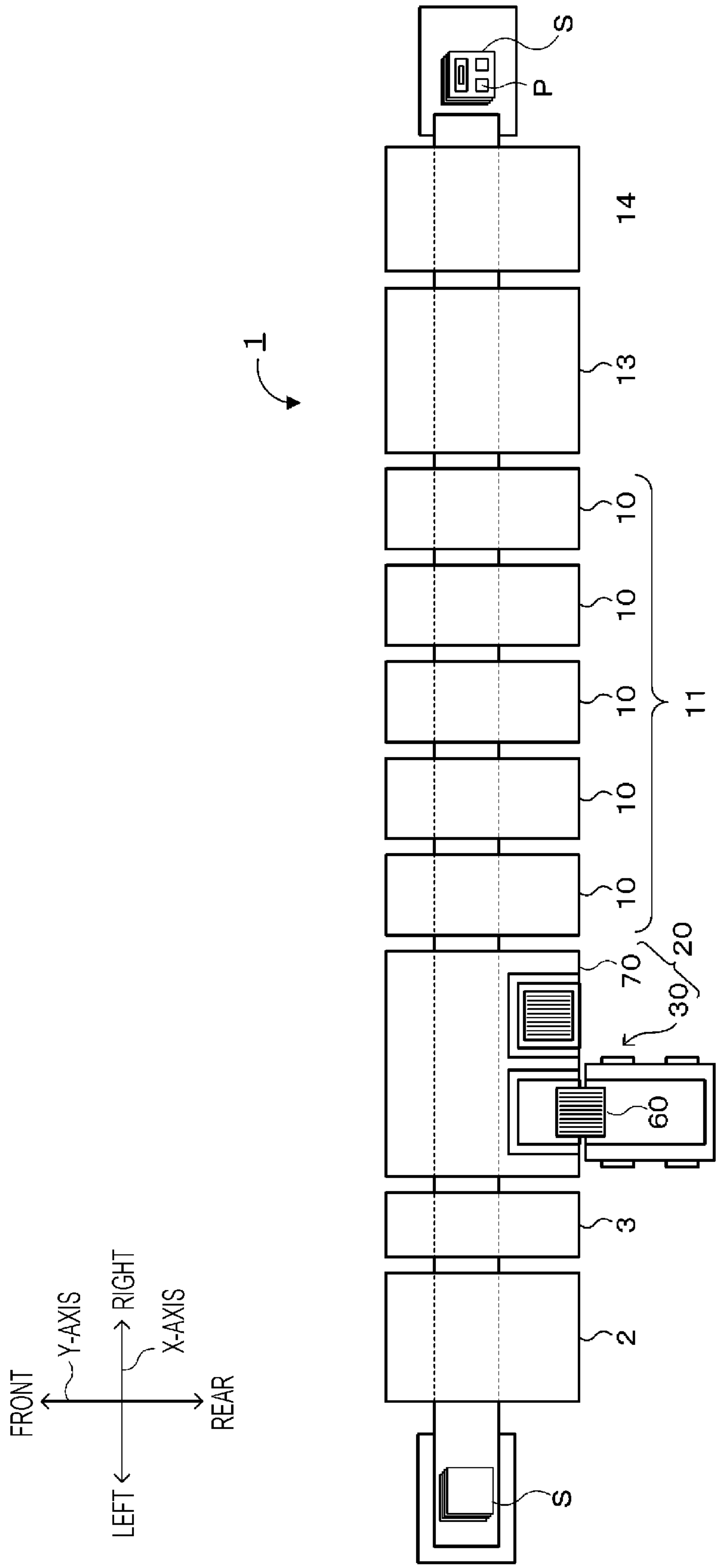
FIG. 1 is a diagram illustrating a schematic configuration of component mounting system 1.
Figure 2:
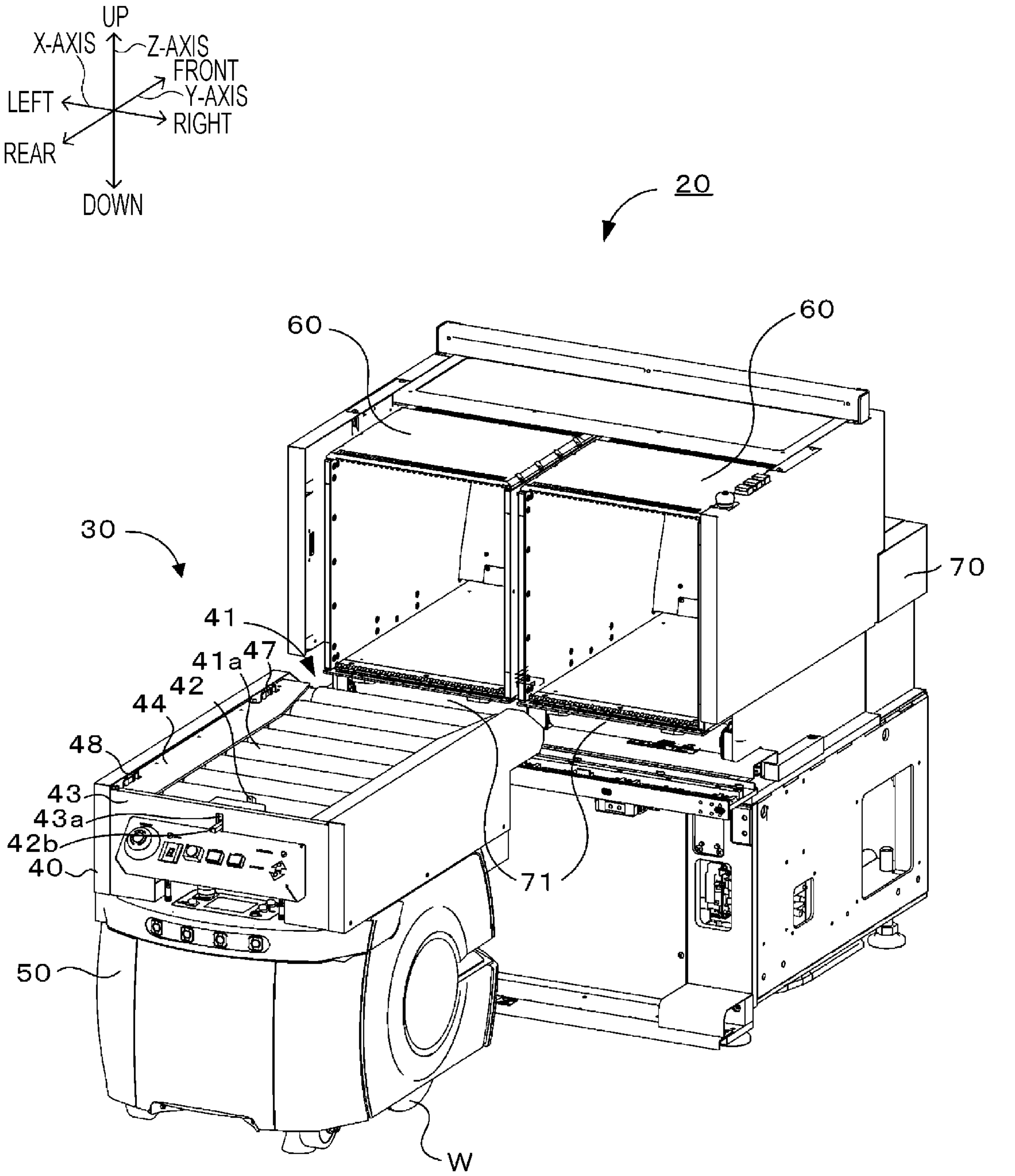
FIG. 2 is a diagram illustrating a schematic configuration of cargo transfer system 20.
Figure 3:
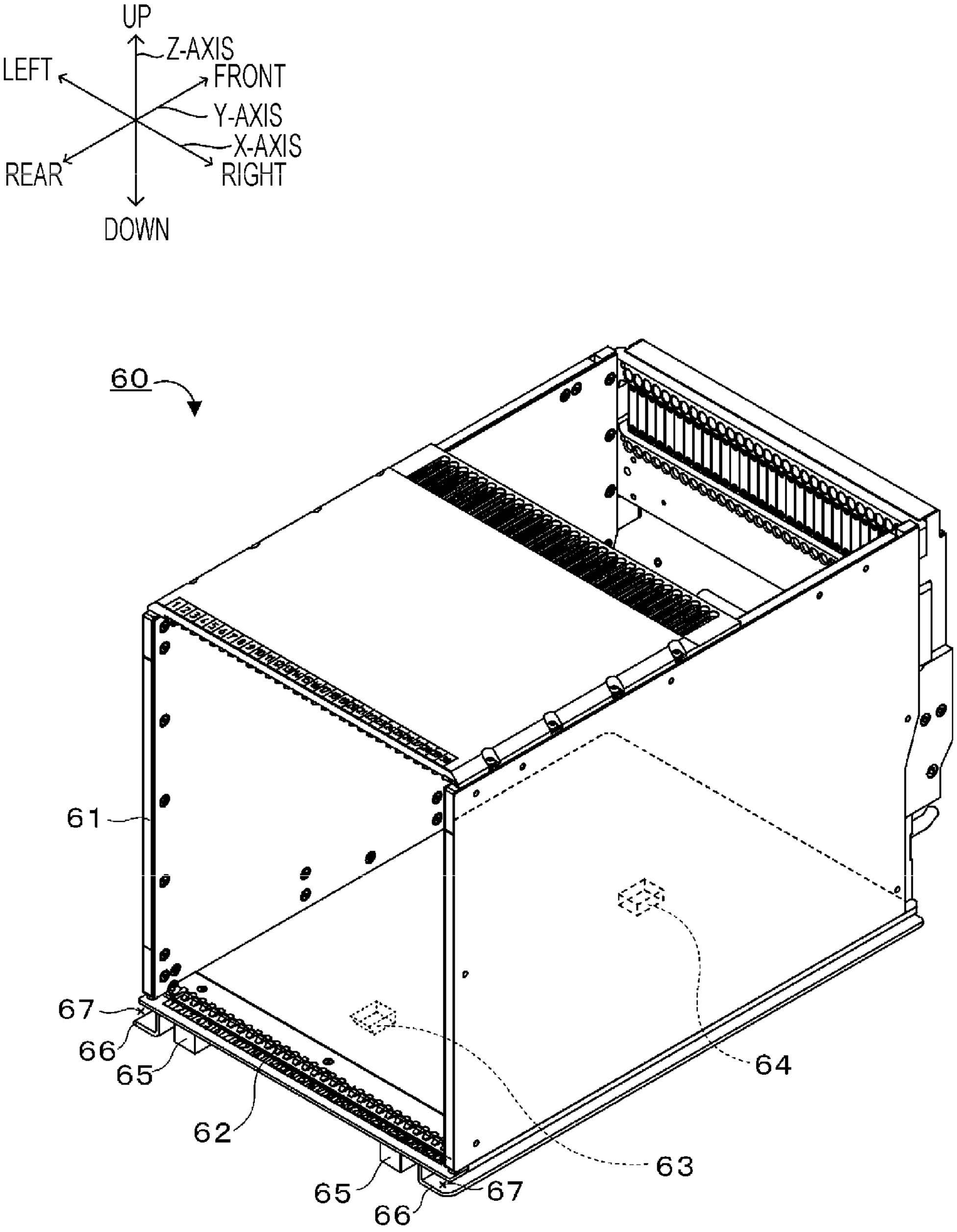
FIG. 3 is a diagram illustrating cargo 60.
Figure 4:
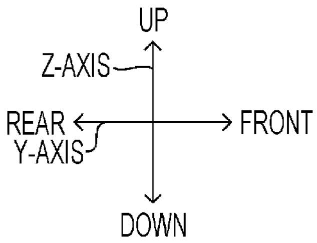
FIG. 4 is a diagram illustrating a schematic configuration of front restriction portion 42.
Figure 4:
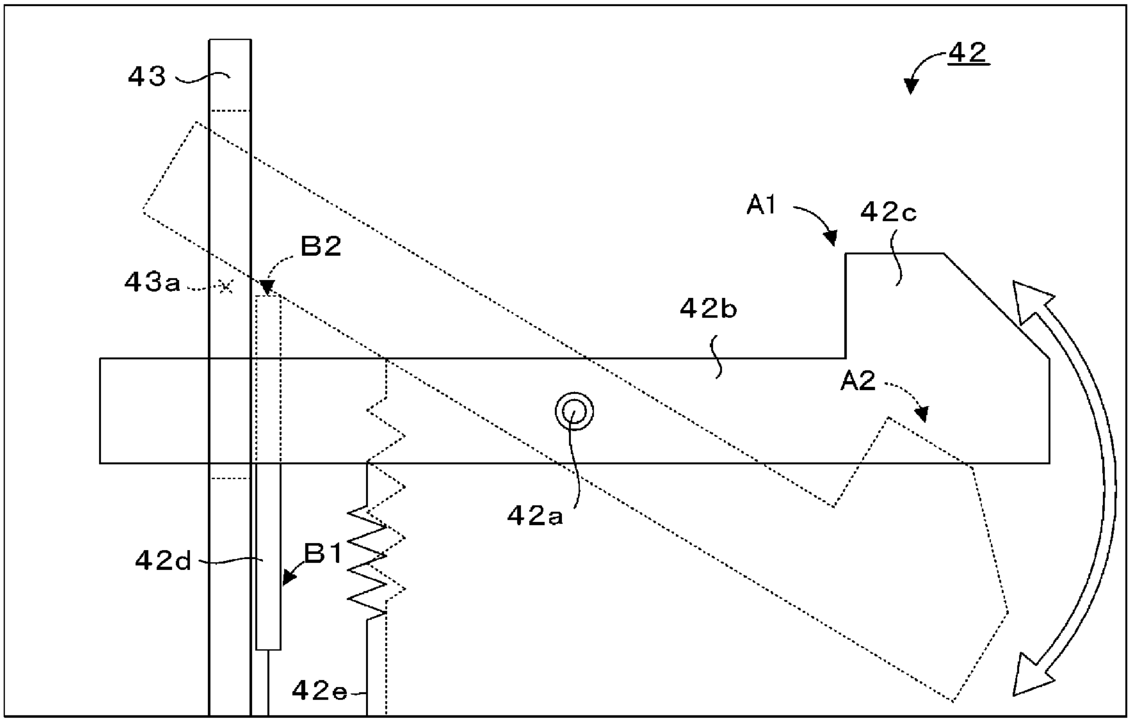
Figure 5:
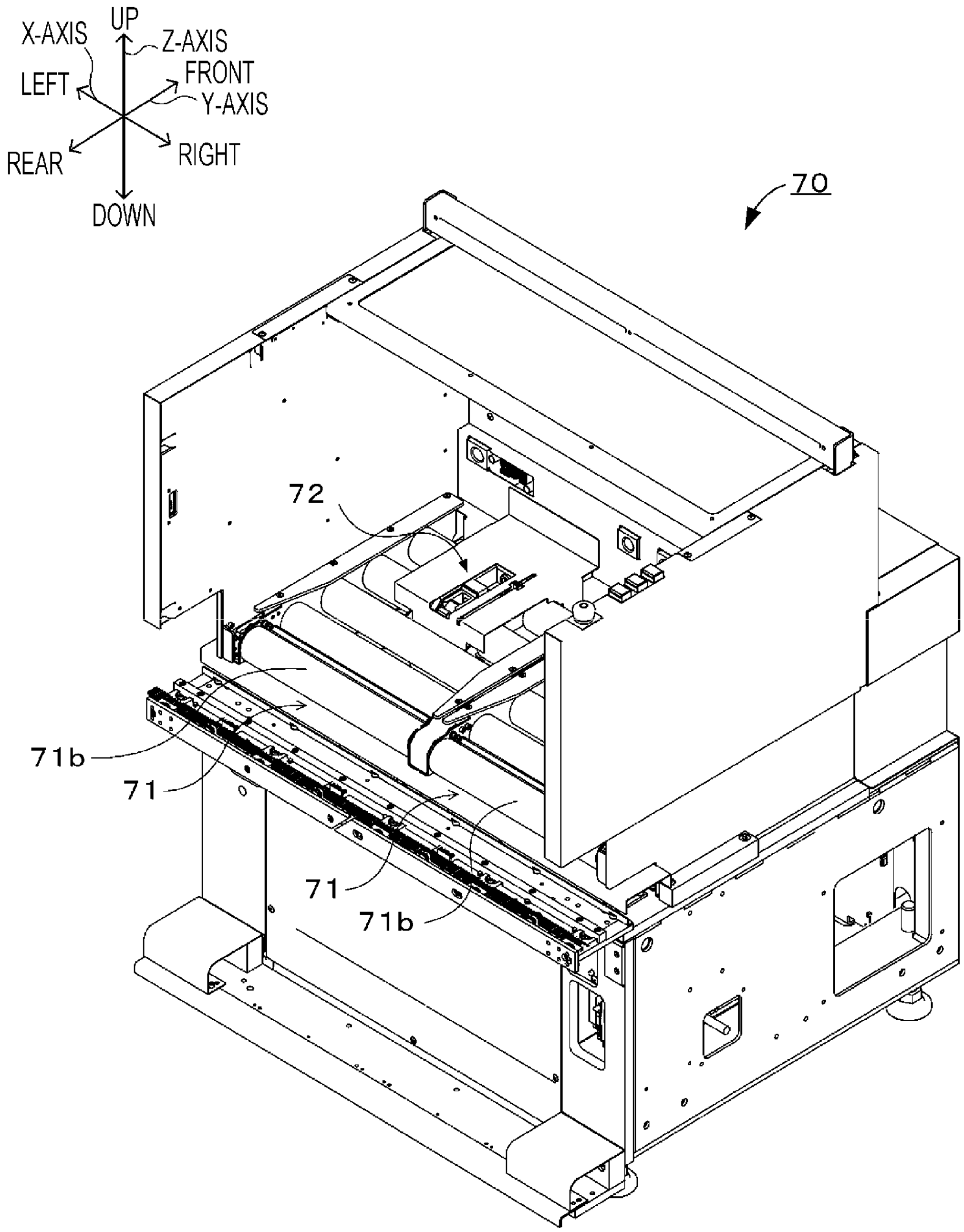
FIG. 5 is a diagram illustrating an example of keeping device 70.
Figure 6:
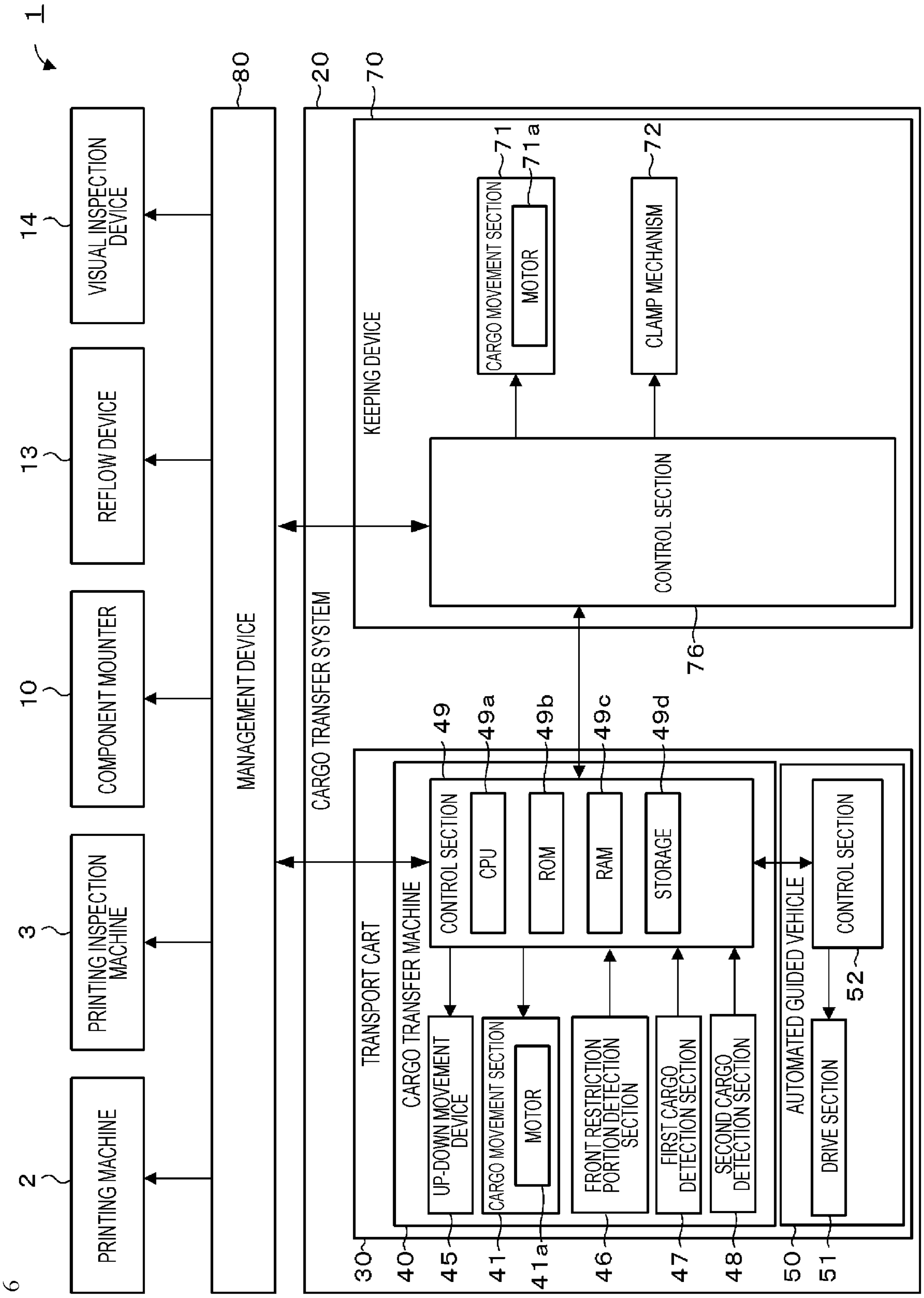
FIG. 6 is a block diagram illustrating an electric connection relationship of component mounting system 1.

Hereinafter, an embodiment of the present disclosure will be described with reference to the accompanying drawings. FIG. 1 is a diagram illustrating a schematic configuration of component mounting system 1, FIG. 2 is a diagram illustrating a schematic configuration of cargo transfer system 20, FIG. 3 is a diagram illustrating cargo 60, FIG. 4 is a diagram illustrating a schematic configuration of front restriction portion 42, FIG. 5 is a diagram illustrating an example of keeping device 70, and FIG. 6 is a block diagram illustrating an electric connection relationship of component mounting system 1. A left-right direction (X-axis direction), a front-rear direction (Y-axis direction), and an up-down direction (Z-axis direction) are as illustrated in FIGS. 1 to 5 (in FIG. 1, the up-down direction is a direction perpendicular to the paper surface, and in FIG. 4, the left-right direction is a direction perpendicular to the paper surface).

Component mounting system 1 includes printing machine 2, printing inspection machine 3, cargo transfer system 20, component mounting line 11, reflow device 13, visual inspection device 14, and management device 80 (see FIG. 6). Printing machine 2 is a machine that prints solder on a wiring pattern of board S, and includes a board conveyance device that conveys board S, a printing head, a head moving device that moves the printing head, a fixing frame to which a screen mask is fixed, a control device that is a computer including CPU, ROM, RAM, a storage (for example, HDD or SSD), and the like. Printing inspection machine 3 is a machine that inspects a state of the solder printed on board S by printing machine 2, and includes an inspection mechanism, a control device (computer) for controlling the inspection mechanism, and the like.

Component mounting line 11 includes multiple (five in the present embodiment) component mounters 10 disposed along a conveyance direction of board S. Component mounter 10 is a device that mounts component P on board S on which the solder is printed by printing machine 2.

Reflow device 13 is disposed downstream of component mounting line 11. Reflow device 13 heats board S to melt the solder, then cools board S to electrically connect component P to board S, and fixes component P to board S. Visual inspection device 14 is disposed downstream of reflow device 13. Visual inspection device 14 determines whether an amount of positional deviation between an actual mounting position and a predetermined target mounting position falls within a visual inspection allowable range for each of components P on board S.

Before describing cargo transfer system 20, cargo 60 that is a transfer target in cargo transfer system 20 will be described. Cargo 60 is, for example, an accommodation case (magazine) capable of accommodating a cassette type tape feeder including a tape reel around which a tape accommodating multiple components P is wound, a tape feeding mechanism, a connector, a feeder control device that controls the tape feeding mechanism, and the like. As illustrated in FIG. 3, cargo 60 includes cargo main body 61, slot 62, engaged portion 63, clamped portion 64, foot portions 65, and auxiliary foot portions 66. Cargo main body 61 is a rectangular parallelepiped housing. Multiple slots 62 are provided along the left-right direction on a bottom surface on a rear entrance side of cargo main body 61. Slot 62 can hold the tape feeder inserted into cargo main body 61 from the rear direction. Engaged portion 63 is a projection provided on a rear side of a back side of the bottom surface of cargo main body 61, and can be engaged with engaging portion 42*c* of front restriction portion 42 described later. Clamped portion 64 is a projection provided on a front side of the back side of the bottom surface of cargo main body 61, and is clamped by clamp mechanism 72 of keeping device 70 described later. Foot portions 65 are members having a rectangular cross section extending in the front-rear direction and provided on the left and right sides of the back side of the bottom surface of cargo main body 61. Auxiliary foot portions 66 are members having an L-shaped cross section extending in the front-rear direction and provided on the left and right sides of the back side of the bottom surface of cargo main body 61 and outside foot portions 65. Space 67 is formed between an upper surface of auxiliary foot portions 66 and the bottom surface of cargo main body 61. A height of auxiliary foot portions 66 is the same as a height of foot portions 65.

As illustrated in FIG. 2, cargo transfer system 20 includes transport cart 30 and keeping device 70, and transfers cargo 60 between transport cart 30 and keeping device 70. Transport cart 30 includes cargo transfer machine 40 and automated guided vehicle 50.

Cargo transfer machine 40 includes cargo movement section 41, front restriction portion 42, rear restriction portion 43, cargo pressing portion 44, front restriction portion detection section 46 (see FIG. 6), first cargo detection section 47, second cargo detection section 48, and control section 49 (see FIG. 6). Cargo 60 can be placed on cargo movement section 41.

Cargo movement section 41 is configured to move cargo 60 horizontally in the front and rear directions opposite to each other. Cargo movement section 41 is, for example, a drive roller conveyor having multiple drive rollers 41*b* rotatable by receiving power of motor 41*a* (see FIG. 6), and can move cargo 60 in the front and rear directions by placing cargo 60 on drive rollers 41*b* and rotating drive rollers 41*b*.

Figure 7:
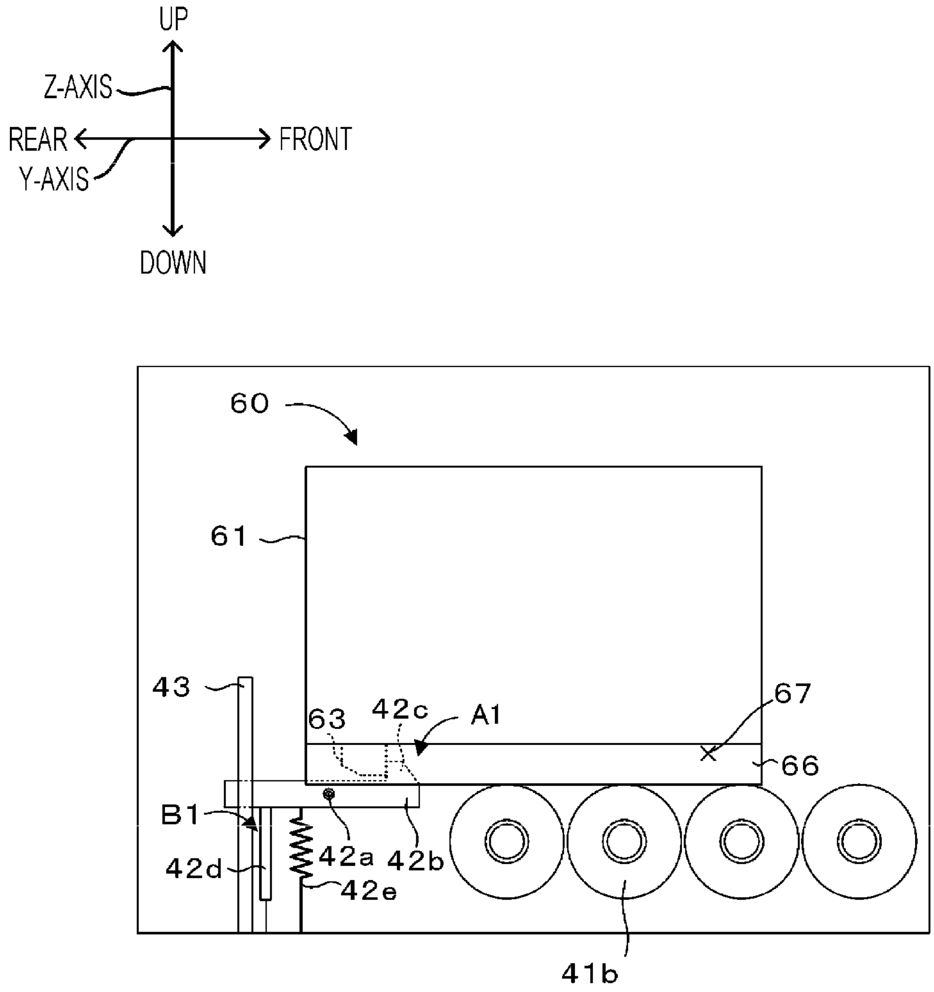
FIG. 7 is a diagram illustrating a state where engaging portion 42*c* and engaged portion 63 are engaged with each other.

Front restriction portion 42 includes main body 42*b*, pin 42*d*, and spring 42*e*. As illustrated in FIG. 4, main body 42*b* is a rod-shaped member provided to be rotatable in the up-down direction about shaft 42*a*. Claw-shaped engaging portion 42*c* is formed at a front end part of main body 42*b*. Engaging portion 42*c* is movable between restriction position A1 and restriction release position A2 that are in an up-down relationship. Spring 42*e* is attached to a rear end part of main body 42*b*. Spring 42*e* biases the rear end part of front restriction portion 42 downward by an elastic force. Pin 42*d* is connected to up-down movement device 45 (see FIG. 6) configured as an air cylinder or a linear motor, and is movable in the up-down direction between lower position B1 and upper position B2 by power of up-down movement device 45. When pin 42*d* is positioned at lower position B1, the rear end part of main body 42*b* biased downward by spring 42*e* is positioned in a state of being in contact with an upper end of pin 42*d*. In this case, engaging portion 42*c* of front restriction portion 42 is positioned at restriction position A1 (see FIG. 7). On the other hand, when pin 42*d* is positioned at upper position B2, an upper surface of pin 42*d* pushes up the rear end part of main body 42*b* against the biasing of spring 42*e*. In this case, engaging portion 42*c* of front restriction portion 42 is positioned at restriction release position A2.

Rear restriction portion 43 is a wall-shaped member that restricts the movement of cargo 60 in the rear direction. Rear restriction portion 43 is provided at a position at which rear restriction portion 43 can come into contact with a rear surface of cargo 60. Rear restriction portion 43 is formed with groove 43*a* penetrating rear restriction portion 43 in the front-rear direction and extending in the up-down direction. As illustrated in FIGS. 2 and 4, the rear end part of main body 42*b* of front restriction portion 42 is inserted into groove 43*a*.

Cargo pressing portion 44 is a rail-shaped member provided along the front-rear direction above both left and right sides of cargo movement section 41. When cargo 60 is transported by placing cargo 60 on cargo movement section 41, cargo pressing portion 44 is inserted into space 67 provided in auxiliary foot portions 66 of cargo 60 and presses auxiliary foot portions 66 from above, thereby preventing cargo 60 from floating.

Front restriction portion detection section 46 is a light shielding sensor that detects a position of engaging portion 42*c* of front restriction portion 42. Front restriction portion detection section 46 outputs a detection signal for detecting that engaging portion 42*c* of front restriction portion 42 is located at restriction release position A2.

First cargo detection section 47 and second cargo detection section 48 are light shielding sensors disposed at a front end part and a rear end part of cargo movement section 41, respectively, and output detection signals indicating that cargo 60 is present when cargo 60 passes.

Control section 49 is a computer including CPU 49*a*, ROM 49*b*, RAM 49*c*, storage 49*d*, and the like. Control section 49 receives the input of the detection signal from front restriction portion detection section 46, the input of the detection signal from first cargo detection section 47, or the input of the detection signal from second cargo detection section 48. Control section 49 outputs a control signal to up-down movement device 45 or outputs a control signal to cargo movement section 41. Furthermore, control section 49 exchanges signals with control section 52 of automated guided vehicle 50, control section 76 of keeping device 70, and management device 80.

As illustrated in FIG. 2, automated guided vehicle 50 is equipped with cargo transfer machine 40 on an upper surface thereof, and is configured as, for example, an automatic guided vehicle (AGV) or an autonomous mobile robot (AMR). Automated guided vehicle 50 includes drive section 51, control section 52 (see FIG. 6), and wheels W. Drive section 51 is, for example, a rotational drive motor that rotates wheels W. Control section 52 is a computer including CPU, ROM, RAM, a storage, and the like. Control section 52 outputs a control signal to drive section 51.

As illustrated in FIG. 5, keeping device 70 is a device that keeps cargo 60. Keeping device 70 is provided between printing inspection machine 3 and component mounting line 11. Keeping device 70 includes multiple (two in the present embodiment) cargo movement sections 71, clamp mechanism 72, and control section 76 (see FIG. 6). Cargo movement section 71 is, for example, a drive roller conveyor having multiple drive rollers 71*b* rotatable by receiving power of motor 71*a* (see FIG. 6), and can move cargo 60 in the front and rear directions by placing cargo 60 on drive rollers 71*b* and rotating drive rollers 71*b*. Clamp mechanism 72 clamps clamped portion 64 of cargo 60 stopped at a predetermined position of cargo movement section 71 by interposing clamped portion 64 from the front and rear directions, or releases the clamping of clamped portion 64. Control section 76 is a computer including CPU, ROM, RAM, a storage, and the like, and outputs a control signal to motor 71*a* or outputs a control device to clamp mechanism 72.

Management device 80 is a device that manages entire component mounting system 1, includes CPU, ROM, RAM, a storage, and the like, and is a computer to which an input device, such as a keyboard or a mouse, or a display is connected. The storage of management device 80 stores a production program of board S, production information related to production of board S, and the like. Here, the production program defines a mounting order of components P for board S in multiple component mounters 10 in component mounting system 1, a production number of boards S, and the like. Management device 80 outputs a control signal to printing machine 2, outputs a control signal to printing inspection machine 3, outputs a control signal to component mounter 10, outputs a control signal to reflow device 13, or outputs a control signal to visual inspection device 14.

Next, the operation of transport cart 30 will be described. After transferring cargo 60 to cargo transfer machine 40 in a warehouse (not illustrated), transport cart 30 moves from the warehouse to the front of keeping device 70 of component mounting system 1 and transfers cargo 60 to keeping device 70. The series of operations will be described in detail below. The warehouse is located at a place different from the place at which component mounting system 1 is installed.

Figure 8:
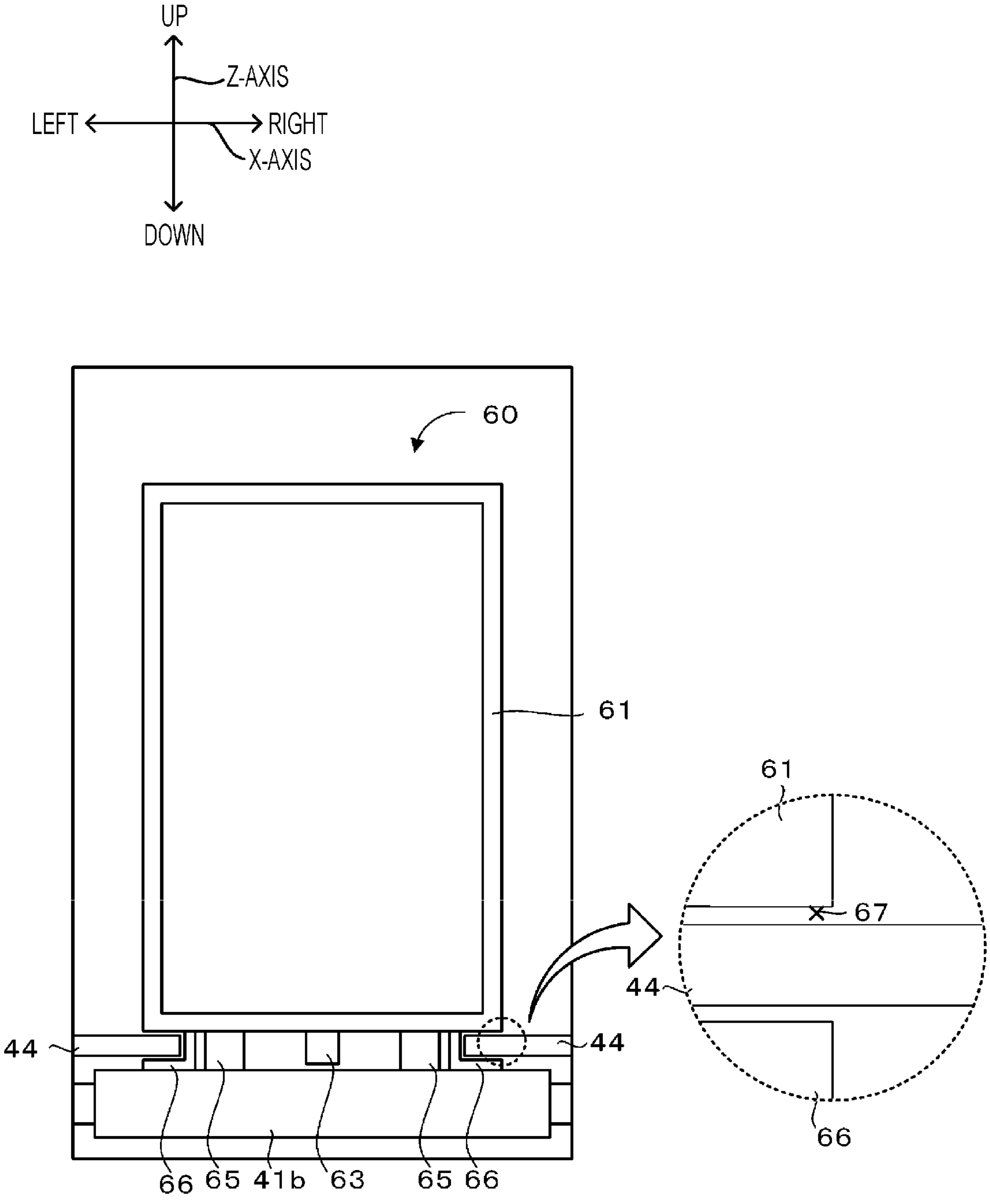
FIG. 8 is a diagram illustrating a state where cargo 60 is placed on cargo transfer machine 40.
Figure 9:
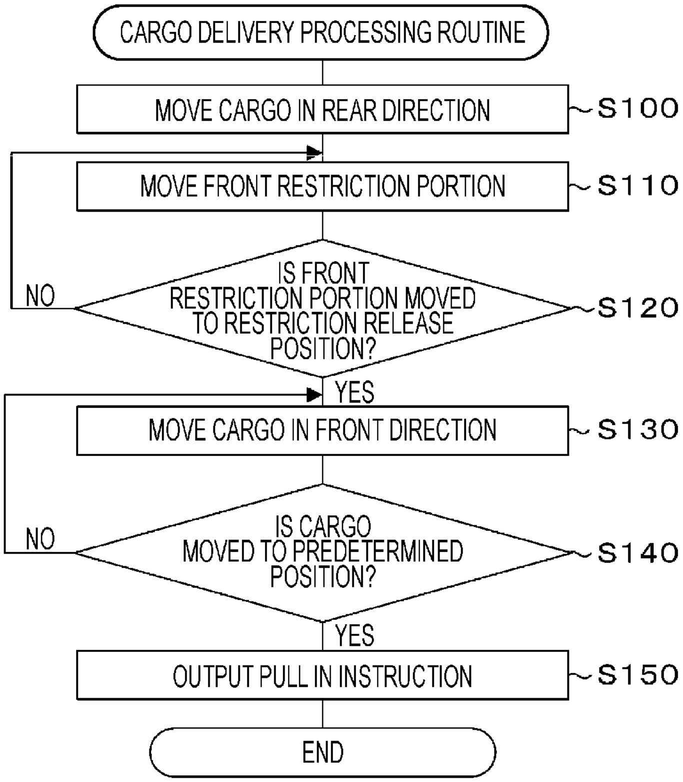
FIG. 9 is a flowchart illustrating an example of a cargo delivery processing routine.

First, cargo 60 is transferred to cargo transfer machine 40 in the warehouse. Cargo 60 is moved from a side of cargo transfer machine 40 on which rear restriction portion 43 is not provided to cargo movement section 41. In this case, as illustrated in FIG. 8, cargo 60 is transferred by drive rollers 41*b* of cargo movement section 41 while cargo pressing portion 44 of cargo transfer machine 40 enters space 67 of auxiliary foot portions 66 of cargo 60. When engaged portion 63 of cargo 60 arrives at a position facing engaging portion 42*c* of front restriction portion 42, control section 49 stops cargo movement section 41. Subsequently, control section 49 causes up-down movement device 45 to move pin 42*d* to upper position B2. Then, engaging portion 42*c* of front restriction portion 42 moves to restriction position A1 and engages with engaged portion 63 of cargo 60 (see FIG. 7). As a result, the movement of cargo 60 in the front direction is restricted. In this state, drive section 51 is controlled by control section 52 of automated guided vehicle 50, and transport cart 30 automatically moves from the warehouse to keeping device 70.

While transport cart 30 moves from the warehouse to keeping device 70, the movement of cargo 60 in the front direction is restricted by front restriction portion 42, and the movement of cargo 60 in the rear direction is restricted by rear restriction portion 43. Therefore, cargo 60 on cargo movement section 41 does not move greatly in the front-rear direction. Further, since the up-down movement of cargo 60 is restricted by cargo pressing portion 44, cargo 60 does not move greatly in the up-down direction.

When transport cart 30 arrives at keeping device 70, control section 52 of automated guided vehicle 50 stops the driving of drive section 51. In this case, transport cart 30 and keeping device 70 have a positional relationship illustrated in FIG. 2 (note that cargo 60 is placed on cargo transfer machine 40). Subsequently, control section 49 of cargo transfer machine 40 reads out and executes a cargo delivery processing routine stored in storage 49*d*.

Figure 10A:
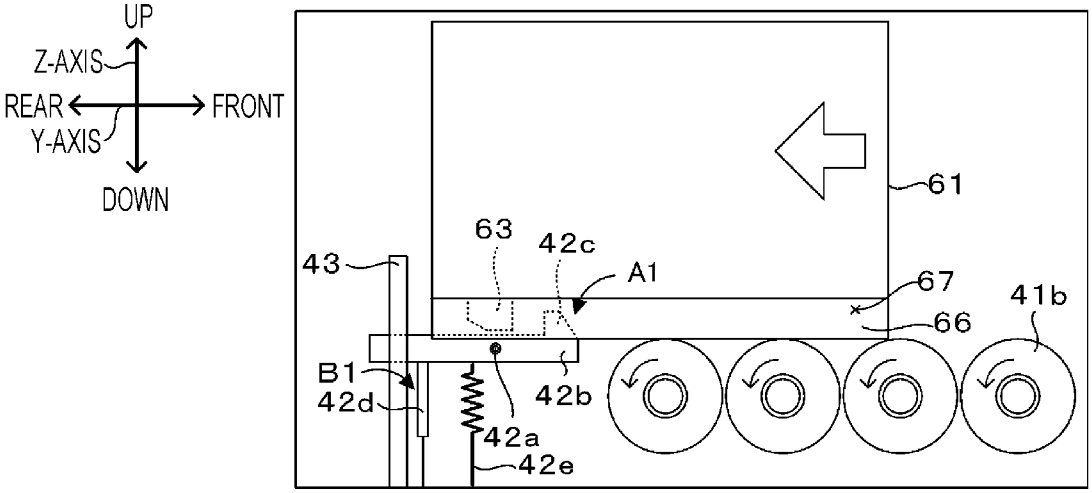
FIG. 10 is a diagram illustrating a state of cargo delivery processing.

When the present routine is started, CPU 49*a* executes pre-restriction release processing for moving cargo 60 in the rear direction (S100). Specifically, as illustrated in FIG. 10A, CPU 49*a* drives and controls motor 41*a* of cargo movement section 41 to rotate drive rollers 41*b* from the front side to the rear side so that cargo 60 moves once in the rear direction while maintaining a state where front restriction portion 42 is located at restriction position A1. An amount of movement in this case is, for example, several mm to several cm. Accordingly, even when engaging portion 42*c* of front restriction portion 42 and engaged portion 63 of cargo 60 are strongly engaged with each other while transport cart 30 is moving from the warehouse to keeping device 70, the engagement between engaging portion 42*c* of front restriction portion 42 and engaged portion 63 of cargo 60 is relaxed by executing the pre-restriction release processing.

Figure 10B:
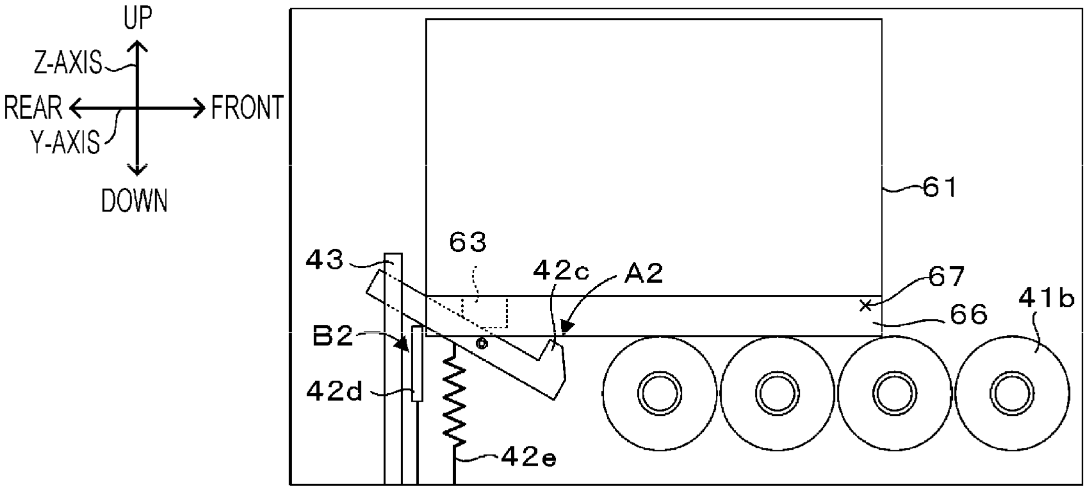

Subsequently, CPU 49*a* causes up-down movement device 45 to move pin 42*d* to upper position B2 as illustrated in FIG. 10B, thereby moving engaging portion 42*c* of front restriction portion 42 toward restriction release position A2 (S110). Subsequently, CPU 49*a* determines whether engaging portion 42*c* of front restriction portion 42 has moved to restriction release position A2 (S120). When the detection signal of engaging portion 42*c* of front restriction portion 42 is input from front restriction portion detection section 46, CPU 49*a* determines that engaging portion 42*c* of front restriction portion 42 has moved to restriction release position A2. On the other hand, when the detection signal of engaging portion 42*c* of front restriction portion 42 is not input from front restriction portion detection section 46, CPU 49*a* determines that engaging portion 42*c* of front restriction portion 42 has not moved to restriction release position A2.

Figure 10C:
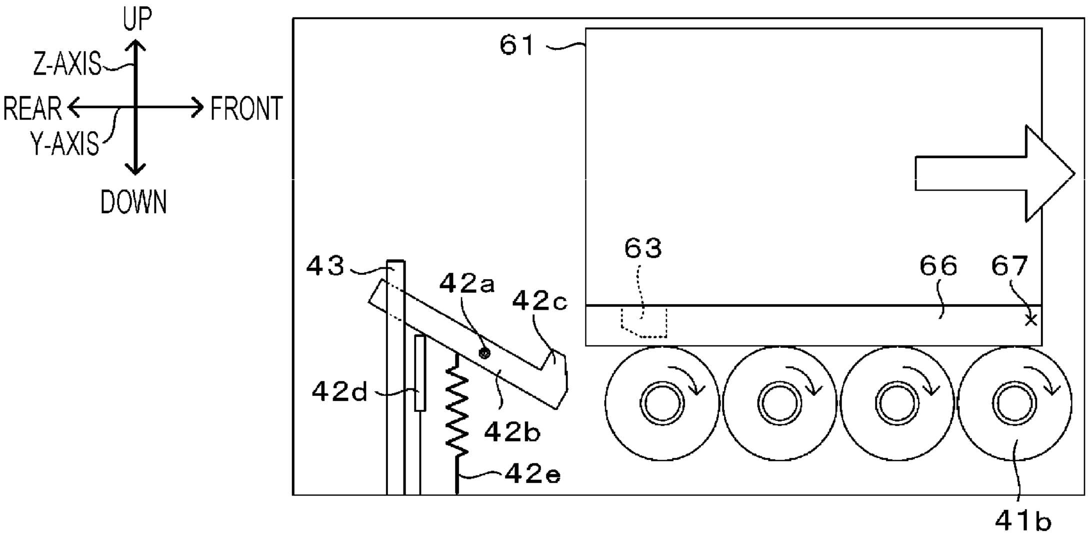

In a case where it is determined in S120 that engaging portion 42*c* of front restriction portion 42 has not moved to restriction release position A2, CPU 49*a* returns to S110 again. On the other hand, in a case where it is determined in S120 that engaging portion 42*c* of front restriction portion 42 has moved to restriction release position A2, CPU 49*a* moves cargo 60 in the front direction (S130). Specifically, as illustrated in FIG. 10C, CPU 49*a* drives and causes motor

41*a* of cargo movement section 41 to move drive rollers 41*b* from the rear side to the front side so that cargo 60 moves in the front direction.

Subsequently, CPU 49*a* determines whether cargo 60 has moved to a predetermined position (S140). Specifically, when the detection signal from first cargo detection section 47 is no longer input, CPU 49*a* determines that cargo 60 has moved to the predetermined position. On the other hand, when the detection signal from first cargo detection section 47 is input, CPU 49*a* determines that cargo 60 has not moved to the predetermined position.

In a case where it is determined in S140 that cargo 60 has not moved to the predetermined position, CPU 49*a* returns to 130 again. On the other hand, in a case where it is determined in S140 that cargo 60 has moved to the predetermined position, CPU 49*a* outputs an instruction to pull in cargo 60 to control section 76 of keeping device 70 (S150), and terminates the present routine.

After the pull in instruction is input, control section 76 of keeping device 70 causes motor 71*a* to pull cargo 60 in keeping device 70, then stops cargo 60 at a position at which clamped portion 64 of cargo 60 faces clamp mechanism 72, and controls clamp mechanism 72 so that clamp mechanism 72 engages with clamped portion 64.

Here, a correspondence relationship between the elements of the present embodiment and the elements of the present disclosure will be clarified. Cargo movement section 41 of the present embodiment corresponds to a cargo movement section of the present disclosure, front restriction portion 42 corresponds to a first direction restriction portion, and control section 49 corresponds to a control section. Further, rear restriction portion 43 corresponds to a second direction restriction portion, cargo pressing portion 44 corresponds to a cargo pressing portion, and front restriction portion detection section 46 corresponds to a detection section.

In transport cart 30 described above, the pre-restriction release processing of controlling cargo movement section 41 so that cargo 60 moves once in the rear direction while maintaining a state where front restriction portion 42 is located at restriction position A1 before engaging portion 42*c* of front restriction portion 42 located at restriction position A1 is moved to restriction release position A2 is executed. For example, after transport cart 30 is transported in a state where cargo 60 is placed on cargo movement section 41 and front restriction portion 42 is positioned at restriction position A1, it may be difficult to easily move front restriction portion 42 to restriction release position A2 because cargo 60 is strongly pressed against engaging portion 42*c* of front restriction portion 42 due to vibration or the like. Even in this case, in transport cart 30, since the pre-restriction release processing described above is executed, engaging portion 42*c* of front restriction portion 42 can be easily moved to restriction release position A2.

In addition, transport cart 30 includes wall-shaped rear restriction portion 43 that is provided at a position at which rear restriction portion 43 can come into contact with the rear surface of cargo 60, and restricts the movement of cargo 60 in the rear direction. Therefore, when engaging portion 42*c* of front restriction portion 42 is located at restriction position A1, the movement of cargo 60 in the front direction and the rear direction is restricted.

Further, transport cart 30 includes cargo pressing portion 44 provided above cargo movement section 41 along the front or rear direction. Therefore, it is possible to prevent cargo 60 placed on cargo movement section 41 from floating.

Furthermore, transport cart 30 includes front restriction portion detection section 46 that detects the position of engaging portion 42*c* of front restriction portion 42, and control section 49 controls motor 41*a* of cargo movement section 41 so that cargo 60 moves in the front direction after the signal that detected that engaging portion 42*c* of front restriction portion 42 is located at restriction release position A2 is input from front restriction portion detection section 46 when cargo 60 is moved in the front direction. That is, since cargo 60 is moved in the front direction after it is confirmed that engaging portion 42*c* of front restriction portion 42 is located at restriction release position A2, it is possible to prevent a failure caused by moving cargo 60 in the front direction before engaging portion 42*c* of front restriction portion 42 moves to restriction release position A2.

In transport cart 30, engaged portion 63 is provided on the bottom surface of cargo 60. Front restriction portion 42 includes main body 42*b* rotatable in the up-down direction about shaft 42*a*, and engaging portion 42*c* provided at the end part of main body 42*b* and restricting the movement of cargo 60 in the front direction by engaging with engaged portion 63 when front restriction portion 42 is located at restriction position A1. Front restriction portion 42 is movable between restriction position A1 and restriction release position A2 by the rotation of main body 42*b* about shaft 42*a*. In such transport cart 30, since engaging portion 42*c* of front restriction portion 42 and engaged portion 63 of cargo 60 are strongly engaged with each other, and it is relatively often difficult to easily move engaging portion 42*c* of front restriction portion 42 to restriction release position A2, it is highly significant to apply transport cart 30.

The present disclosure is not limited in any way to the embodiment described above, and it is needless to say that the present disclosure can be implemented in various forms without departing from the technical scope of the present disclosure.

For example, in the embodiment described above, transport cart 30 includes cargo transfer machine 40 and automated guided vehicle 50, but the configuration is not limited to this. For example, transport cart 30 may have a configuration in which the wheels are directly provided on cargo transfer machine 40 without including automated guided vehicle 50. In this case, an operator may transport cargo transfer machine 40, or a separate automated guided vehicle may tow cargo transfer machine 40.

In the embodiment described above, front restriction portion 42 is provided on the rear side of cargo movement section 41, but the configuration is not limited to this. For example, front restriction portion 42 may be provided in front of cargo movement section 41.

In the embodiment described above, front restriction portion 42 restricts the movement of cargo 60 in the front direction by engaging claw-shaped engaging portion 42*c* with projection-shaped engaged portion 63 provided on cargo 60, but the configuration is not limited to this. For example, the movement of cargo 60 in the front direction may be restricted by engaging claw-shaped engaging portion 42*c* provided at a distal end of main body 42*b* with recess-shaped engaged portion 63 provided on the bottom surface of cargo 60. Alternatively, front restriction portion 42 may be plate-shaped or rod-shaped member provided to be movable in the up-down direction, and front restriction portion 42 may be inserted into recess-shaped engaged portion 63 to restrict the movement of cargo 60 in the front direction or may move downward from engaged portion 63 to allow the movement of cargo 60 in the front direction, or front restriction portion 42 may protrude to the front direction of cargo 60 to restrict the movement of cargo 60 in the front direction or is retracted from the front of cargo 60 to allow the movement of cargo 60 in the front direction.

In the embodiment described above, it is confirmed that engaging portion 42*c* of front restriction portion 42 is located at restriction release position A2 by inputting the detection signal from front restriction portion detection section 46, but the configuration is not limited to this. For example, it may be confirmed that engaging portion 42*c* of front restriction portion 42 is located at restriction release position A2 based on an elapsed time from the start of the downward movement of front restriction portion 42.

In the embodiment described above, the tape feeder is accommodated in cargo 60, but the configuration is not limited to this. Cargo 60 may accommodate a member used in a device other than component mounter 10, for example, a member, such as a screen mask, used for printing the solder on board S by printing machine 2. Alternatively, cargo 60 may accommodate various members used in a work machine (for example, printing machine 2, printing inspection machine 3, component mounter 10, reflow device 13, visual inspection device 14, or the like) that executes predetermined work on board S.

The transport cart of the present disclosure may be configured as follows.

The transport cart of the present disclosure may further include a wall-shaped second direction restriction portion provided at a position at which the second direction restriction portion is capable of coming into contact with a surface on a second direction side of the cargo and configured to restrict the movement of the cargo in the second direction. With this configuration, when the first direction restriction portion is located at the restriction position, the movement of the cargo in the first direction and the movement of the cargo in the second direction are restricted.

The transport cart of the present disclosure may further include a cargo pressing portion provided above the cargo movement section along the first direction or the second direction. With this configuration, it is possible to prevent the cargo placed on the cargo movement section from floating.

The transport cart of the present disclosure may further include a detection section configured to detect a position of the first direction restriction portion, in which the control section may be configured to control the cargo movement section so that the cargo moves in the first direction after a signal that detected that the first direction restriction portion is located at the restriction release position is input from the detection section when the cargo is moved in the first direction. With this configuration, since the cargo is moved in the first direction after it is confirmed that the first direction restriction portion is located at the restriction release position, it is possible to prevent a failure caused by moving the cargo in the first direction before the first direction restriction portion moves to the restriction release position.

In the transport cart of the present disclosure, an engaged portion may be provided on a bottom surface of the cargo, and the first direction restriction portion may include a main body rotatable about a shaft in an up-down direction and an engaging portion provided at an end part of the main body and configured to restrict the movement of the cargo in the first direction by engaging with the engaged portion when the first direction restriction portion is located at the restriction position, and may be movable between the restriction position and the restriction release position by the rotation of the main body about the shaft. In such a transport cart, since the engaging portion of the first direction restriction portion and the engaged portion of the cargo are strongly engaged with each other, and it is relatively often difficult to easily move the first direction restriction portion to the restriction release position, it is highly significant to apply the transport cart of the present disclosure.

INDUSTRIAL APPLICABILITY

The object of the present disclosure can be used in the manufacturing industry of the board on which the components are mounted.

REFERENCE SIGNS LIST

1: component mounting system, 2: printing machine, 3: printing inspection machine, 10: component mounter, 11: component mounting line, 13: reflow device, 14: visual inspection device, 20: cargo transfer system, 30: transport cart, 40: cargo transfer machine, 41: cargo movement section, 41*a*: motor, 41*b*: drive roller, 42: front restriction portion, 42*a*: shaft, 42*b*: main body, 42*c*: engaging portion, 42*d*: pin, 42*e*: spring, 43: rear restriction portion, 43*a*: groove, 44: cargo pressing portion, 45: up-down movement device, 46: front restriction portion detection section, 47: first cargo detection section, 48: second cargo detection section, 49: control section, 49*a*: CPU, 49*b*: ROM, 49*c*: RAM, 49*d*: storage, 50: automated guided vehicle, 51: drive section, 52: control section, 60: cargo, 61: cargo main body, 62: slot, 63: engaged portion, 64: clamped portion, 65: foot portion, 66: auxiliary foot portion, 67: space, 70: keeping device, 71: cargo movement section, 71*a*: motor, 71*b*: drive roller, 72: clamp mechanism, 76: control section, 80: management device, A1: restriction position, A2: restriction release position, B1: lower position, B2: upper position, L: cross section, P: component, S: board, W: wheel

The invention claimed is:

1. A transport cart comprising:

a cargo movement section configured to place a cargo thereon and move the cargo along a path in a horizontal first direction and a second direction opposite to the first direction;

a first direction restriction portion provided to be movable between a restriction position and a restriction release position that are in an up-down relationship and configured to restrict a movement of the cargo placed on the cargo movement section in the first direction at the restriction position and allow the movement of the cargo placed on the cargo movement section in the first direction at the restriction release position;

a second direction restriction portion fixedly provided at a position at which the second direction restriction portion is capable of coming into contact with a surface on a second direction side of the cargo, the second direction restriction portion configured to restrict the movement of the cargo in the second direction; and a control section configured to execute pre-restriction release processing of controlling the cargo movement section so that the cargo moves once in the second direction while maintaining a state where the first direction restriction portion is located at the restriction position before the first direction restriction portion located at the restriction position is moved to the restriction release position.

2. The transport cart according to claim 1,
wherein the second direction restriction portion is wall-shaped and provided at an end of the cargo movement section in the second direction at a position at which the second direction restriction portion is capable of coming into contact with the surface on the second direction side of the cargo.

3. The transport cart according to claim 1, further comprising:
a cargo pressing portion provided above the cargo movement section along the first direction or the second direction.

4. The transport cart according to claim 1, further comprising:
a detection section configured to detect a position of the first direction restriction portion,
wherein the control section is configured to control the cargo movement section so that the cargo moves in the first direction after a signal that detected that the first direction restriction portion is located at the restriction release position is input from the detection section when the cargo is moved in the first direction.

5. The transport cart according to claim 1,
wherein an engaged portion is provided on a bottom surface of the cargo, and
the first direction restriction portion includes a main body rotatable about a shaft in an up-down direction and an engaging portion provided at an end part of the main body and configured to restrict the movement of the cargo in the first direction by engaging with the engaged portion when the first direction restriction portion is located at the restriction position, and is movable between the restriction position and the restriction release position by rotation of the main body about the shaft.

6. The transport cart according to claim 1,
wherein the second direction restriction portion includes a groove through which the first direction restriction portion penetrates.

7. The transport cart according to claim 6,
wherein the first direction restriction portion extends through the groove perpendicular to the second direction restriction portion.

* * * * *